United States Patent [19]
Haddad

[11] 3,718,562
[45] Feb. 27, 1973

[54] ELECTRODE ASSEMBLY
[75] Inventor: Ihsan A. Haddad, Bedford, Mass.
[73] Assignee: Instrumentation Laboratory, Inc., Lexington, Mass.
[22] Filed: May 18, 1970
[21] Appl. No.: 38,202

[52] U.S. Cl. ............................................. 204/195 P
[51] Int. Cl. ............................................ G01n 27/46
[58] Field of Search ..................... 204/1 T, 195 PR

[56] References Cited

UNITED STATES PATENTS

| | | |
|---|---|---|
| 3,070,539 | 12/1962 | Arthur et al. ....................... 204/195 |
| 3,088,905 | 5/1963 | Glover................................. 205/195 |
| 3,098,813 | 7/1963 | Beebe et al. ......................... 204/195 |
| 3,278,408 | 10/1966 | Leonard et al. ..................... 204/195 |
| 3,328,204 | 6/1967 | Grubb ................................. 204/195 |
| 3,394,069 | 7/1968 | Solomons ............................ 204/195 |
| 3,410,778 | 11/1968 | Krasberg ............................. 204/195 |
| 3,432,418 | 3/1969 | Kleiss ................................. 204/195 |
| 3,510,420 | 5/1970 | Mills .................................. 204/195 |

3,574,078 4/1971 Hynes et al. ...................... 204/195 P

*Primary Examiner*—T. Tung
*Attorney*—Willis M. Ertman

[57] ABSTRACT

An electrode assembly includes an elongated tubular support member to which is secured a coupling structure. An electrode structure is supported by the coupling structure and has a sensing surface that projects externally of the coupling structure. A housing structure has a selectively permeable membrane secured over an opening at one end so that a chamber is defined for receiving an electrolyte solution. The housing is connected to the coupling structure so that the exposed sensing surface of the electrode structure is disposed in the electrolyte structure with its sensing surface in contact and distorting the membrane structure. The housing and coupling structures have cooperating engaged locating surfaces that define the amount of permitted distortion of the membrane structure.

14 Claims, 3 Drawing Figures

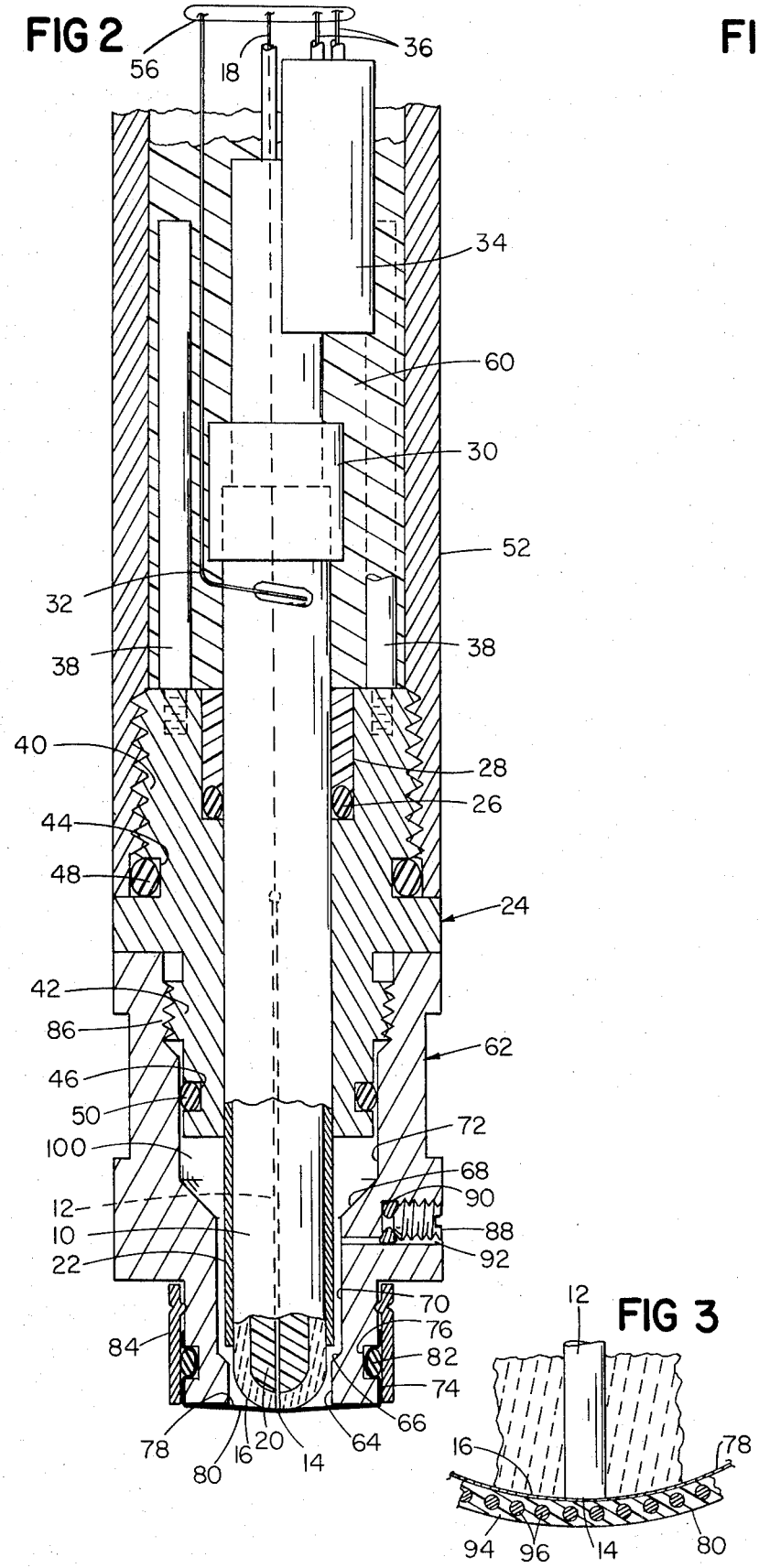
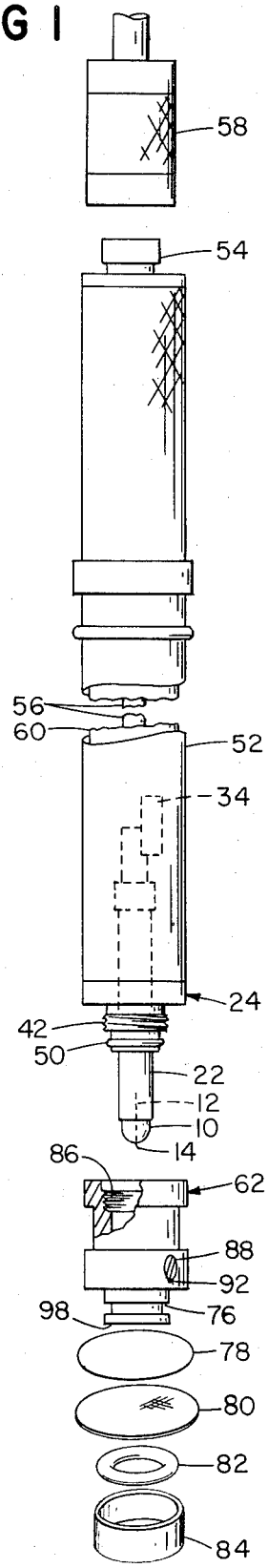
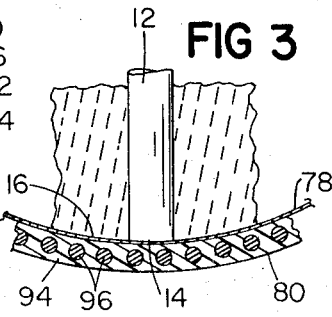

ELECTRODE ASSEMBLY

SUMMARY OF INVENTION

This invention relates to electrode assemblies for use in analysis of fluids, and more particularly to electrode assemblies of the type that employs a selectively permeable membrane interposed between the electrode and the sample to be analyzed.

Electrode assemblies, for example of the polarographic or coulometric type, employ a membrane that is sufficiently permeable to a constituent of interest so that an acceptable response time for the electrode assembly may be obtained. The characteristics of the electrode assembly are a function of relationships of components of the electrode assembly to the membrane and to the electrolyte interposed between electrode components and the membrane. Changes in these relationships, due for example to disassembly of electrode components, replacement or recharging of the electrolyte, or external forces such as occur in an automatic sample induction system result in non-reproduceability of readings and render calibration of the electrode assembly difficult.

It is an object of this invention to provide a novel and improved electrode assembly utilizing a selectively permeable membrane which exhibits rapid response time and the desired high degree of sensitivity for this type of instrument.

Another object of the invention is to provide a novel and improved electrode assembly of the type that employs a selectively permeable membrane which is rugged and reliable in operation and has a long life.

Still another object of the invention is to provide a novel and improved electrode assembly which facilitates assembly and calibration.

Still another object of the invention is to provide a novel and improved electrode assembly of the type which employs a selectively permeable membrane in which the boundary conditions between the electrode and the membrane are established and stabilized with greater precision.

A further object of the invention is to provide an electrode assembly of the type which employs a selectively permeable membrane which is simple to assemble and to charge with electrolyte and which may be used in systems in which the membrane and/or electrode assembly is subjected to external distorting conditions of varying magnitudes such as exist in a continuous process system or in a system that employs automatic sample induction.

In accordance with the invention there is provided an electrode assembly which includes an electrode carrying body having an electrode exposed at the end surface of the body and a housing for receiving the electrode carrying body. The housing has a first opening through which the electrode carrying body is inserted and a second opening. A selectively permeable membrane structure is secured over the second opening in sealing relation to define a chamber for receiving an electrolyte. The housing further includes a clamping structure for securing the electrode carrying body in the housing with the electrode end surface in engagement with the membrane structure.

In a preferred embodiment, a fermentation electrode assembly, the membrane material is dimethyl silicone rubber which is permeable to oxygen. The membrane has a thickness in the order of five to six thousandths of an inch and includes a reinforcing web which supports the permeable material. Suitable reinforcing web materials include both metals and plastics and may be of various forms for example, woven mesh or perforated sheet. The web material preferably is inert, that is, it does not interfere with the analysis or contaminate the material being analyzed. This membrane structure is secured over the second opening in the housing to define a stiff wall and the electrode end surface is forced against the membrane by the clamping structure to establish a particular set of boundary conditions between the membrane, the electrolyte and the electrode surface.

Electrode assemblies constructed in accordance with the invention provide accurate, reliable and easily calibratable outputs of high sensitivity. The assembly is rugged and has long life. The components are convenient to assemble and on assembly the same configuration and boundary conditions can be re-established, thus easing the calibration. The electrode assemblies provide reproduceable readings with little drift and have rapid response time. This electrode construction can be used with various known analysis reactions involving selectively permeable membranes, such as polarographic, galvanic, voltametric or amperometric determinations of oxygen content and potentiometric equilibrium measurements for carbon dioxide.

Other objects, features and advantages will be seen as the following description of a particular embodiment progresses, in conjunction with the drawing, which embodiment is given by way of illustration or example.

In the drawings:

FIG. 1 is an exploded view of components of an electrode assembly constructed in accordance with the invention;

FIG. 2 is a sectional view of the electrode assembly shown in FIG. 1; and

FIG. 3 is an enlarged sectional view of the lower end of the electrode assembly shown in FIG. 2.

DESCRIPTION OF PARTICULAR EMBODIMENT

The electrode assembly shown in FIGS. 1 and 2 includes an elongated cylindrical glass tube 10, 0.23 inch in diameter and about three inches long that has a 0.010 inch diameter platinum electrode 12 fused into the end of glass tube 10 with its end surface 14 exposed at the curved end surface 16 of tube 10. Platinum wire 12 is connected to conductor 18 and is secured in position in tube 10 with a silastic potting compound 20 to provide a rigid assembly which may be sterilized at 260° F. A silver sleeve 22 is secured on electrode tube 10 and coupling 24 (of a fluorocarbon plastic (e.g. Kel. F)) is disposed over sleeve 22. Coupling 24 includes an internal bore that defines a recess in which O-ring seal 26 and silicone rubber seal 28 are disposed. A seal sleeve 30 is fitted over the upper end of silver sleeve 22. Sleeve 22 is connected to external conductor 32 and thermistor 34 is connected to external circuitry by means of conductors 36. Metal protective rods 38 are secured to coupling 24. Coupling 24 has external threads 40, 42 and grooves 44, 46 in which O-rings 48, 50 are disposed. A stainless steel cylindrical tubular housing 52 of appropriate length depending on the particular application of the electrode assembly—typical lengths ranging from 6 to 17 inches—is threadedly secured to the upper end of coupling 24. At its remote end housing 52 has a terminal structure 54 connected to the cable 56 of conductors 18, 32 and 36 to which is attachable a conventional cable connector 58. Cabling 56, thermistor 34 and rods 38 are secured in sleeve 52 by suitable potting material 60 such as an epoxy resin.

Housing 62 also of suitable high temperature polymeric material such as a fluorocarbon plastic (Kel. F) has a bore 64 which receives the tip of electrode tube 10. Above bore 64 are tapered transition walls 66, 68 and second and third bores 70, 72 of larger diameter. In the lowest outer peripheral surface 74 of housing 62 opposite bore 64 is formed groove 76 in which cellophane sheet 78 and permeable membrane 80 are secured with O-ring 82. Stainless steel ring 84 is disposed over O-ring 82 and crimped into surface 74 to more firmly secure it in place.

Housing 62 includes above bore 72 a threaded section 86 which engages threaded section 42 of coupling 24, so that bore 72 overlies O-ring 50 and a seal is provided at that point. The upper surface of housing 62 engages the lower flange surface of coupling 24 and thus precisely positions membrane 80 relative to electrode tip 14. A relief valve is provided by set screw 88 which cooperates with O-ring 90 and passage 92. In another embodiment, a resilient sealing band is disposed in an annular recess that communicates with passage 92 and provides a check valve structure that also allows release of fluid pressure from within the housing assembly.

Additional details of the membrane 80 will be seen with reference to FIG. 3. The membrane 80 includes dimethyl silicone rubber 94 and a reinforcing matrix 96 and typically has a thickness of 5 to 6 mils. In one embodiment reinforcing matrix 96 is a 250 × 250 wire mesh of type 304 stainless steel. In another embodiment the reinforcing matrix 96 is 400 needle – 15 denier nylon mesh. The reinforcing matrix preferably is at least 50 percent open to provide adequate permeation paths for the constituent of interest through the membrane structure. Membrane 80 is relatively stiff and is secured firmly by O-ring 82 so that it is only minimally deflected when the tip 16 of the electrode body 10 engages the membrane. A spacer sheet 78 of 0.5 mil cellophane or polyfluorocarbon plastic (Teflon) may be employed in conjunction with membrane 80. The permeability of this membrane structure to oxygen ($O_2$) is in excess of about $3 \times 10^{-8}$ cc, cm/cm$^2$, sec, cmHg$\Delta$p. Other permeable materials may be used as a function of the constituent to be analyzed, the membrane material being permeable to that constituent and relatively impermeable to other constituents found in the sample which may cause adverse reaction with the particular electrode system employed.

In assembling the electrode assembly, silicone rubber sealant is applied to the end surface 98 of housing 62 and membrane 80 (and the optional sheet 78 if desired) is stretched across the lower opening of housing member 62 and secured by O-ring 82. Sleeve 84 is then urged over O-ring 82 to clamp the margins of membrane 80 and the O-ring 82 in position and crimped in position. A suitable electrolyte, for example a pH7 phosphate buffer with 1N sodium chloride, is then placed in the chamber 100 thus formed. The electrode body 10 with coupling 24 and sleeve 62 are assembled together as the projecting portion of the electrode body is inserted into chamber 100 and threaded into position through engagement of threads 42 and 86 so that O-ring seal 50 engages the wall of bore 72 to provide a seal at that point. The electrolyte that is displaced by the insertion of the electrode into the chamber is allowed to pass through passage 92 and the valve is then closed by clamping O-ring 90 with set screw 88. Electrode tip 14 is positioned firmly against membrane 80, tip 14 protruding typically 0.010–0.015 inch beyond the undistorted plane of cellophane sheet 78.

The electrode assembly is suitable for on stream measurements such as monitoring a fermentation process. In other embodiments the electrode assembly may be used in conjunction with systems in which a sample to be analyzed is automatically induced into and flushed from a sample chamber under pressure. The reinforced, securely clamped membrane structure withstands the pressure differentials that are imposed on the electrode assembly by sample induction or changes in flow conditions so that changes in boundary conditions between the membrane 80 and the tip 14 of electrode 12 are minimized. A reproduceable geometry is provided by the seat surface of coupling 24 that mates with the upper wall of housing 62. Measuring apparatus coupled to cable 56 responds to the current between conductors 18 and 32 which in turn is a function of the quantity of oxygen entering the electrolyte.

I claim:

1. An electrode assembly comprising a housing having a first opening at one end, a unitary membrane structure secured over said opening to define a chamber for receiving an electrolyte, said membrane structure comprising a selectively permeable material and a porous reinforcing web embedded therein in a manner such that one surface of said membrane structure consists solely of selectively permeable material, said housing defining a second opening for receiving an electrode structure, an electrode structure having a body, a first electrode exposed at an end surface of said body, and a second electrode supported on said body and spaced from said first electrode, and structure for securing said electrode structure with the end surface of said electrode body extending into said chamber so that said first electrode is immediately adjacent but spaced from said one surface of said membrane by said electrolyte and said second electrode is spaced further from said membrane structure than said first electrode.

2. The electrode assembly as claimed in claim 1 wherein said reinforcing web is a stainless steel wire mesh.

3. The electrode assembly as claimed in claim 1 wherein said reinforcing web is a mesh of organic polymeric material.

4. The electrode assembly as claimed in claim 1 wherein said selectively permeable material is dimethyl silicone rubber.

5. The electrode assembly as claimed in claim 1 wherein said housing includes a projecting boss surrounding said first opening, an annular recess in the peripheral wall of said boss, and resilient securing means for cooperation with said recess for securing said membrane structure on said boss so that said membrane structure overlies all of said first opening.

6. In an ionic transducer for reaction with a sample, two electrodes; an electrically insulating body; one of said electrodes being carried in said body and having a face exposed at an end of said body; a membrane structure comprising a selectively permeable material and a porous reinforcing web embedded therein; means clamping said membrane structure over said end of said electrode body such that one surface of said membrane structure is exposed for contact with the sample and the other surface of said membrane structure and said end of said body defines an electrolyte film space; and means for electrically connecting said electrode to an indicating device, said web being spaced from said electrodes.

7. The electrode assembly as claimed in claim 6 wherein said selectively permeable material overlies the surface of said web facing said electrode body and said other membrane surface consists solely of said selectively permeable material.

8. The electrode assembly as claimed in claim 7 wherein said selectively permeable material is dimethyl silicone rubber.

9. The electrode assembly as claimed in claim 8 wherein said reinforcing web is a stainless steel wire mesh.

10. The electrode assembly as claimed in claim 8 wherein said reinforcing web is a mesh of organic polymeric material.

11. An electrode assembly comprising an elongated tubular support member, coupling structure secured to said support member, an electrode structure supported by said coupling structure, said electrode structure including an electrically insulating body, a first electrode carried in said body, the face of said first electrode being exposed at the end of said body to define a sensing surface, and a second electrode carried on said body, a housing structure having a first opening at one end, a membrane structure secured over said opening to define a chamber for receiving an electrolyte, said membrane structure comprising a selectively permeable material and a porous reinforcing web embedded therein, said housing and said coupling structures being connected together and having cooperating, engaged locating surfaces that define the location of said electrode sensing surface relative to said membrane structure such that said web is electrically insulated from said first and second electrodes and said electrode sensing surface distorts said membrane structure when said housing and coupling structures are secured together and said second electrode is in contact with said electrolyte.

12. The electrode assembly as claimed in claim 11 wherein said membrane structure includes an electrolyte carrying member in contact with said electrode sensing surface.

13. The electrode assembly as claimed in claim 11 wherein said selectively permeable material overlies the surface of said web to provide a membrane surface consisting solely of said selectively permeable material that defines one wall of said electrolyte receiving chamber.

14. The electrode assembly as claimed in claim 13 wherein said selectively permeable material is dimethyl silicone rubber.

* * * * *